(12) United States Patent
Pommier et al.

(10) Patent No.: US 12,496,774 B2
(45) Date of Patent: Dec. 16, 2025

(54) 3-D OBJECT COMPRISING A SANDWICH OF ONE OR MORE COMPOSITE LAYERS, OF ONE OR MORE LAYERS OF METAL PATTERNS AND OPTIONALLY OF ONE OR MORE LAYERS OF POSSIBLY DENSE POLYMERS FOR ELECTROMAGNETIC APPLICATIONS IN ANTENNAS AND/OR RADOMES

(71) Applicant: THALES, Courbevoie (FR)

(72) Inventors: Stéphane Pommier, Gennevilliers (FR); Mathilde Bellec, Gennevilliers (FR); Alain Le Fevre, Gennevilliers (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 18/084,490

(22) Filed: Dec. 19, 2022

(65) Prior Publication Data

US 2023/0202099 A1 Jun. 29, 2023

(30) Foreign Application Priority Data

Dec. 23, 2021 (FR) ..................................... 2114331

(51) Int. Cl.
*B29C 64/147* (2017.01)
*B29C 64/188* (2017.01)
(Continued)

(52) U.S. Cl.
CPC .......... *B29C 64/147* (2017.08); *B29C 64/188* (2017.08); *B29C 64/393* (2017.08);
(Continued)

(58) Field of Classification Search
CPC .. B29C 70/42–48; H01Q 15/02; H01Q 1/085; H01Q 1/0046
See application file for complete search history.

(56) References Cited

U.S. PATENT DOCUMENTS

| 6,208,316 B1 | 3/2001 | Cahill |
| 2007/0200787 A1* | 8/2007 | Williams ............... H01Q 15/02 343/872 |

(Continued)

OTHER PUBLICATIONS

Biron, Michel, Thermosets and Composites, 2014, William Andrew, Second Edition, p. 346 (Year: 2014).*

(Continued)

*Primary Examiner* — Andrew L Swanson
(74) *Attorney, Agent, or Firm* — BakerHostetler

(57) ABSTRACT

A process for manufacturing a composite material of 3-D shape, includes a stack of layers of resin and fibre, incorporating at least one metal layer, the process comprising the following steps, a standard unit pattern having been determined for the metal layer: i/ computing periodically organized patterns on the 3-D shape, which is non-developable; then projecting, onto a plane, the patterns, thus defining a planar organization of second patterns; ii/ partially polymerizing, flat, first layers, comprising a metal top layer, of the flat composite stack, so as to make it etchable, but to keep it still deformable; iii/ electrochemically etching the organization of second patterns that was defined in step i into the metal top layer of the flat composite stack resulting from step iv/ carrying out polymerization of the etched composite stack after the stack has been placed in a mould having the desired 3-D shape.

10 Claims, 7 Drawing Sheets

(51) Int. Cl.
  *B29C 64/393* (2017.01)
  *B29L 31/34* (2006.01)
  *B33Y 10/00* (2015.01)
  *B33Y 50/02* (2015.01)
  *B33Y 80/00* (2015.01)

(52) U.S. Cl.
  CPC ....... *B29L 2031/3456* (2013.01); *B33Y 10/00* (2014.12); *B33Y 50/02* (2014.12); *B33Y 80/00* (2014.12)

(56) References Cited

U.S. PATENT DOCUMENTS

| | | | | |
|---|---|---|---|---|
| 2012/0235879 A1* | 9/2012 | Eder | ......................... | H01Q 1/40 |
| | | | | 343/873 |
| 2015/0255877 A1* | 9/2015 | Liu | ......................... | H01Q 15/02 |
| | | | | 343/909 |
| 2017/0352948 A1 | 12/2017 | Urcia et al. | | |

OTHER PUBLICATIONS

Parker, et al., "Rings as elements for Frequency Selective Surface", Electron. Lett., vol. 17, No. 17, pp. 612-614, 1981.

Williams, "Frequency selective terahertz retroreflectors", ProQuest Dissertations and Theses; Thesis (M.S.)—University of Massachusetts, 2014.

Mohamed, "Performance Enhancement of Salisbury Screen Microwave Absorber Using Dual-layer Frequency Selective Surfaces (FSS)", Universiti Tun Hussein Onn Malaysia, 2013.

\* cited by examiner

3-D OBJECT COMPRISING A SANDWICH OF ONE OR MORE COMPOSITE LAYERS, OF ONE OR MORE LAYERS OF METAL PATTERNS AND OPTIONALLY OF ONE OR MORE LAYERS OF POSSIBLY DENSE POLYMERS FOR ELECTROMAGNETIC APPLICATIONS IN ANTENNAS AND/OR RADOMES

CROSS-REFERENCE TO RELATED APPLICATION

This application claims priority to foreign French patent application No. FR 2114331, filed on Dec. 23, 2021, the disclosure of which is incorporated by reference in its entirety.

FIELD OF THE INVENTION

The invention relates to the field of manufacture of 3-D objects comprising a stack of composite material layers comprising at least one layer of metal patterns.

BACKGROUND

First of all, certain terms and notions will be defined.

The invention is notably applicable to production of radomes, reflectors, antenna arrays, reflector arrays or polarizing surfaces. These composite materials (stack of composite materials and of metal patterns) are intended for applications filtering microwaves passing through them, or controlling the propagation of electromagnetic (EM) waves that could be trapped or guided thereby. Applications notably concern radio-communications and radars, and applications related to electromagnetic compatibility, countermeasures and stealth.

Firstly, a radiating aperture is protected from the exterior medium by a radome. The latter generally consists of one or more layers of dielectric material. Very often, it is desired to integrate into this radome metal patterns with the aim notably of improving the performance of the radiating aperture that it protects and/or of providing it with new functionalities, and/or even of protecting it from any undesirable radiation. Such a radome is then called a functionalized radome. Frequency-selective surfaces (FSS), which allow waves that would otherwise irradiate the radiating aperture to be filtered out according to a predetermined template, are a particular case thereof.

Frequency-selective surfaces (FSS) are electromagnetic filtering structures that may be planar (2-D), developable or non-developable (3-D), meta-surfaces, meta-arrays, holographic surfaces, and reflector arrays.

Secondly, a reflector allows the radiating area of an antenna to be increased in order to increase the directivity thereof. Such a reflector generally consists of a single reflecting function, but because of certain technical design constraints, these reflectors or sub-reflectors require there to be integrated into these radiating areas metal patterns included in composite material with the aim notably of improving the performance of the radiating aperture and/or of providing it with new functionalities. Such a reflector or sub-reflector is then called a functionalized reflector or sub-reflector. By way of example, a sub-reflector with inclusion of one or more layers of metal patterns may be reflective at a frequency F1 and transparent electrically at a frequency F2. Or indeed, a reflector may be composed of an exterior ring with inclusion of one or more layers of metal patterns in a composite material in order to produce a reflective surface of diameter D1 at F1 and of diameter D2 at F2 with D1>D2 and F1<F2.

Thirdly, an antenna array is a set of unit antennas arrayed in a periodic, pseudo-periodic and/or fractal arrangement. This array arrangement allows the radiating area of the antenna to be increased and thus directivity and (frequency and/or spatial) agility to be enhanced. Such an antenna generally consists of one or more layers of dielectric materials with inclusion of one or more layers of metal patterns. Here, the metal patterns are the radiating elements of the antenna. The antenna array may thus be conformed to the shape of the carrier in order to improve integration thereof under the environmental constraints, notably in the aeronautical field.

Lastly, a polarizing surface allows the intrinsic polarization of an antenna to be improved or modified. Such a polarizing surface generally consists of one or more layers of dielectric material with inclusion of one or more layers of metal patterns. By way of example, a polarizing surface allows the polarization of a linear-polarization antenna to be converted into circular polarization. Also, a polarizing surface allows the polarization of an elliptical-polarization antenna to be converted into circular polarization.

It will be noted that another type of operation or application may require inclusion of metal patterns into a dielectric substrate, the whole thereof being securely fastened to a conductive plane forming a ground plane. This is the case for example of meta-surfaces, of high-impedance surfaces, or even of reflector arrays.

Strictly speaking, the metal inclusions of a functionalized radome or reflector (or sub-reflector) or polarizing surface may be of any, 2-D or 3-D, shape, the patterns that they form indifferently being connected or unconnected.

However, it is common for these functionalized radomes or reflectors (or sub-reflectors) or polarizing surfaces to be of non-developable (doubly curved) shape generating additional production and design constraints.

By definition, a singly curved surface is a developable ruled surface, i.e. a surface that may be laid on a plane, such as is the case with a cone or cylinder. Two adjacent positions on the generatrix are located in the same plane. A warped surface is a ruled surface that is not developable. Two adjacent positions on the generatrix are not located in the same plane. A number of external surfaces of airborne and ground-based platforms are warped surfaces. A doubly curved surface can be generated only by a curve and comprises no rectilinear element; it is therefore a non-ruled surface. Such a surface, when it is generated by rotation of a curve about an axis located in the plane of the curve, is called a doubly curved surface of revolution. Spheres, tori, ellipsoids of revolution and hyperboloids of revolution are common examples of this type of surfaces. A number of radiating reflector-antenna surfaces are doubly curved surfaces of revolution.

A non-developable surface cannot be laid out flat. It is nevertheless possible to develop them approximately by dividing them into sections and by substituting a developable surface, i.e. a plane or a singly curved surface, for each section.

Known processes for manufacturing composite stacks with inclusion of at least one patterned metal layer have a certain number of drawbacks: they only allow planar parts to be manufactured, these not allowing the required electromagnetic response to be obtained at all the desired frequencies because of the low resolution of additive technologies alone or non-chemical subtractive technologies (only quite large patterns are producible, with an unsatisfactory pattern deformation or repeatability). They are not applicable if more than two layers of metal patterns must form part of the composite. These ways of obtaining materials release heat and require hard materials to be used. This means that the composites are either completely polymerized before processing, or polymerization thereof is completed during processing. It is therefore possible to obtain a composite sheet of non-developable shape with 2 sides patterned, but it will be completely polymerized. It is therefore no longer possible to shape a plurality of stacks because the shapes are set and the polymerization complete. It is impossible to rework the polymerization/bonding process.

FSS are conventionally formed of a periodic array of metal patterns chemically etched into a thin substrate of Kapton, polycarbonate, LCP (liquid-crystal polymer) or the like. This substrate is then itself associated with other strata of dielectric materials, all thereof being polymerized to form a final functionalized radome, or to form the final FSS.

One drawback of this method is that it uses different materials for the dielectric strata alone and for the strata containing the etched metal patterns. Under certain mechanical stresses, notably those encountered in airborne platforms, this difference in materials may lead to a delamination of the composite, degrading its structural properties and possibly even leading to the strata ripping apart. Under certain electromagnetic constraints, notably those of the Ka band, a change in materials may degrade the performance of the electromagnetic response of the FSS. One problem to be solved is therefore notably that of how to include metal patterns (copper or copper/nickel or chromium patterns for example) in a composite object without adding a material other than that of the radome itself, the latter being made of composite material, and for example of quartz/epoxy.

Moreover, frequency-selective surfaces (FSS) are seeing increasing interest in the fields of radio-communication because they allow the performance of antennas to be optimized. FSS are beginning to be integrated into the composite radomes that protect antenna systems. The commonest known solution is to integrate a metallized and etched carrier into the plies of the composite material. In this context, the prior art provides various solutions. Document U.S. Pat. No. 6,208,316 B1 discloses a process in which the metal patterns are manufactured by chemical etching on a carrier of the PTFE-based material called Duroid.

Other methods such as inkjet printing are used to deposit metal on a dielectric carrier, as notably described in the article by E. A. Parker and S. M. A. Hamdy: "Rings as elements for Frequency Selective Surface", Electron. Lett., vol. 17, 1981, pages 612-614 or even patent application US 2017/0352948 A1. The deposited materials are silver- or carbon-based materials, less conductive than pure copper. In addition, these deposition techniques do not allow patterns to be produced with a resolution precise enough to obtain a high-performance electromagnetic response, notably in Ka band.

In the solutions of the prior art the metal patterns are etched on a carrier different from the material of the radome, and in all cases they therefore do not allow conductive metal patterns, notably ones made of copper, to be incorporated into a composite material without addition of an exterior carrier.

It is desired to be able to manufacture 3D shapes, notably non-developable 3D shapes, comprising a stack of composites and of metal patterns, to for example obtain reflectors or radomes possessing one or more frequency-selective layers.

SUMMARY OF THE INVENTION

One aim of the invention is notably to overcome the aforementioned drawbacks of the prior art.

To this end, according to a first aspect, the present invention describes a process for manufacturing a composite material of 3-D shape, comprising a stack of layers of material incorporating at least one layer of metal patterns, said process comprising the following steps, a periodic or pseudo-periodic organization in 2-D of first patterns similar to a standard unit pattern having been determined for said layer of metal patterns depending on the electromagnetic function desired for the layer of metal patterns:

i/ computing first patterns of said periodic organization once laid on the 3-D shape; then projecting, onto a plane, said patterns computed on the 3-D shape, thus defining a planar organization of second patterns;

ii/ partially polymerizing, flat, at least one sub-set of first layers of said stack, so as to make it etchable, but to keep it still deformable, said first layers being flat and comprising at least one metal layer on the surface of said sub-set;

iii/ electrochemically etching said organization of second patterns that was defined in step i into each metal layer of the flat composite stack resulting from step iv/ completely polymerizing the etched composite stack after said stack has been placed in a mould having the desired 3-D shape.

One subject of the invention is a process for manufacturing a composite material of developable or non-developable shape composed of a stack of layers of resin and fibre, incorporating metal patterns, said patterns being obtained by etching at least one metal sheet deposited on at least one layer of fibre pre-impregnated with resin before polymerization and stacking with said layers, said resin-pre-impregnated fibre for example being the same as the resin-pre-impregnated fibre of the other layers of said composite material. Specifically, if the material used is ductile enough, the flat sheets may be drawn, pressed, stamped, embossed or otherwise worked to take the sought shape. Non-developable surfaces are often produced via a combination of developable surfaces that are then adjusted slightly to achieve the required shape.

This innovation thus allows parts of non-developable shapes composed of composite materials with inserts of one or more layers of etched metal patterns of particular shapes to be manufactured.

The invention allows:
    starting with one or more planar surfaces, metal patterns to be obtained on a non-developable surface by using a sufficiently ductile material (passage from the 2-D surface to the non-developable 3-D surface) and producing an approximate but sufficiently precise development of N sections. These developable surfaces, either a plane or a singly curved surface, are substituted for these N sections.
    2-D manufacturing files of the periodic or pseudo-periodic metal patterns to be produced with a very fine resolution and a high reliability (few defects);
    the composite assembly to be formed with the one or more periodic or pseudo-periodic metal patterns.

In some embodiments, such a process will further comprise at least one of the following features:
    the shape is a non-developable shape;

at the end of step i:
the value of at least one parameter indicating deformations between the patterns projected onto said 3-D shape and the target unit pattern is computed; and said computed value is compared to a threshold; and if said value is higher than the threshold, a modification is made to said periodic or pseudo-periodic organization in 2-D of first patterns and/or to one or more first patterns; and before step ii is implemented, step i is iterated on the basis of said periodic or pseudo-periodic organization in 2-D of first patterns that was obtained after modification, steps ii to iv then being implemented on the basis of the planar organization of second patterns that was obtained after modification;

one or more parameters are computed among a parameter indicating a lengthwise deformation of the patterns and a parameter indicating an anglewise deformation of the patterns;

a deformation map is computed that represents, as a function of the position, on said 3-D shape, of the projected pattern, a deformation level;

the sub-set of first layers considered in step i comprises a metal layer on the bottom face of said sub-set and a metal layer on the top face of said sub-set and patterns are etched into each of the two metal layers in step the stack having to comprise a plurality of sub-sets each comprising a stack of one or more layers of resin and fibre and of one or more periodic or pseudo-periodic metal layers:

all of steps i, ii and iii are implemented on each sub-set, each sub-set being associated with its own organization of periodic or pseudo-periodic patterns; and step iv of complete polymerization in the mould is then implemented once the sub-sets resulting from each from steps i, ii and iii have been stacked or laid together in the mould;

the function of said metal patterns is at least one function among that of filtering electromagnetic waves, of being an assembly or sub-assembly of the radiating element of an antenna and/or of modifying the behaviour of the incident electromagnetic wave;

the function of said metal patterns is to receive or transmit electromagnetic waves.

To this end, according to another aspect, the present invention describes a process for manufacturing an element, comprising a process for manufacturing a composite stack such as defined above, wherein the element is an element among an antenna, a radome and a polarizing surface.

BRIEF DESCRIPTION OF THE DRAWINGS

The invention will be better understood and other features, details and advantages will become more clearly apparent on reading the following non-limiting description, and by virtue of the appended figures, which are given by way of example.

DETAILED DESCRIPTION

Figure 1:
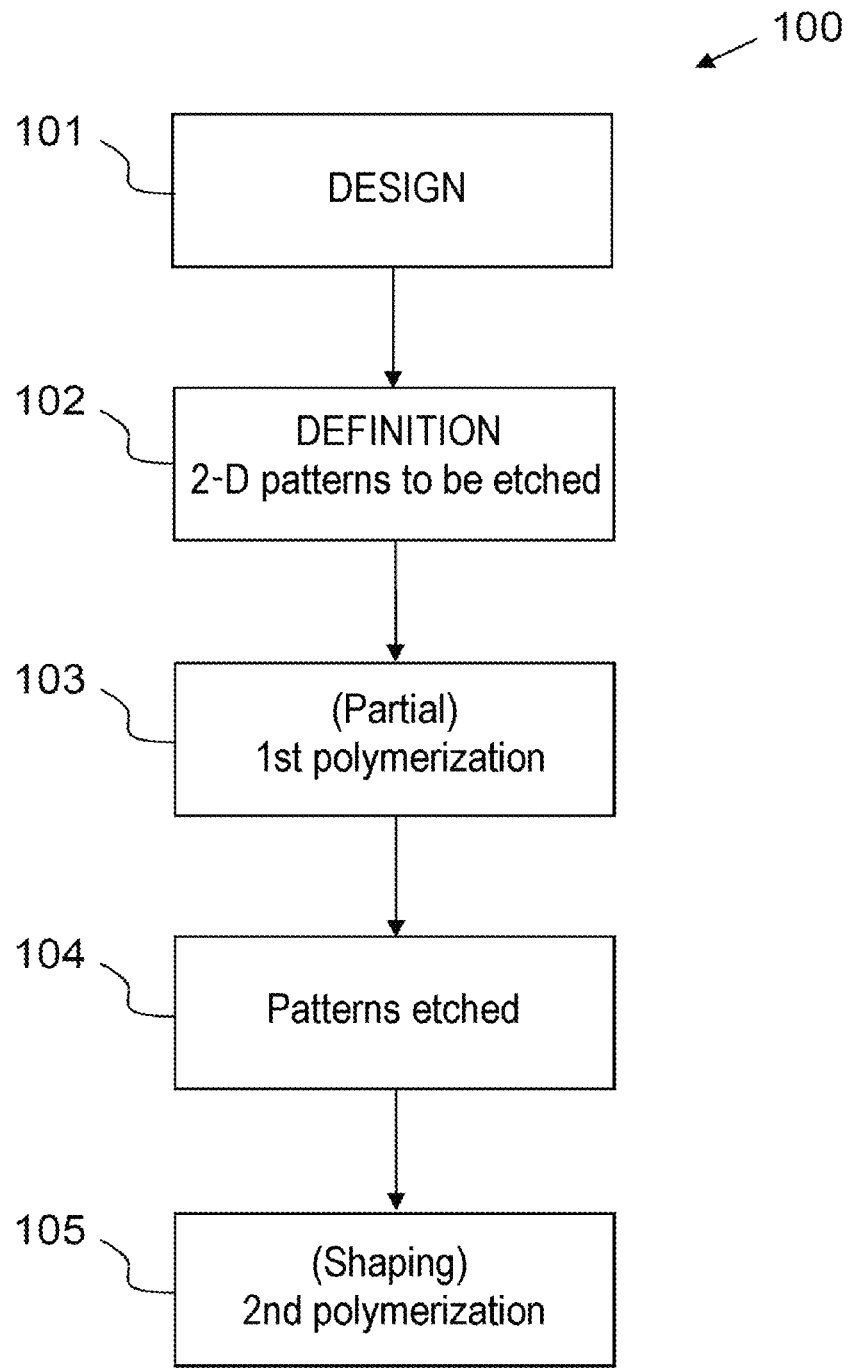
FIG. 1 shows the steps of a process in one embodiment of the invention.

FIG. 1 shows the steps of a process 100 for manufacturing non-developable surfaces from composite material comprising one or more layers of periodic or pseudo-periodic metal patterns.

As known, a composite material is a material composed from a plurality of materials of different origin or nature (and thus associated with mechanical characteristics that are superior to those of its component materials).

In a step of design 101:
the developable or non-developable (and therefore non-planar) 3-D shape of the surface S to be manufactured, the working frequency bands, the desired electromagnetic property (in terms of radiation, polarization, filtering, etc.) are chosen (for example, it is desired to manufacture a parabolic antenna the reflector of which is reflective in one frequency band and transparent in other frequency bands, for a given polarization);

depending on these elements, the type of the unit metal pattern associated with the number n of layers of patterns in a particular composite is chosen so that the unit pattern (filter, radiating element, polarizer, etc.) delivers the required electromagnetic performance.

Generally, the periodic or pseudo-periodic structures may be categorized into two groups: patches and slots.

For example, in the particular case of FSS, a simple frequency-selective structure may therefore be considered to be a periodic array of patches (low-pass filter) or a periodic array of slots (high-pass filter): Saleh Omar Mohamed, "Performance enhancement of Salisbury screen microwave absorber using dual-layer frequency selective surfaces (FSS)", 2013; there are various resonant patterns depending on the requirements (polarization, electrical size, agility, etc.): examples of patterns are presented in R. J. Williams, "Frequency selective terahertz retroreflectors", 2014.

The aim is to achieve, at the end of the process 100, on the non-developable 3-D surface S once manufactured, a set of etched metal patterns repeated over the 3-D surface periodically or pseudo-periodically and each having dimensions and angles that are ideally identical to those of the standard unit pattern. To this end, the following steps are implemented.

In a step 102, the definition of a planar surface composed of an arrangement of patterns (called second patterns below) to be etched (for example a parabolic surface for an antenna of 2 m) is obtained, by implementing sub-steps 102_1 to 102_5 using a 2-D projection software module.

This 2-D projection software module firstly allows the distribution and shape (that of the standard unit pattern) of the patterns sought in 3-D on the final shape to be defined, and this model to be projected to give the patterns to be etched in 2-D (the second patterns). These second patterns to be etched in 2-D or at least a certain number thereof are distinct from the standard unit pattern.

Specifically, if all that was done was to etch, on a 2-D surface, a repetition of the unit pattern organized with the desired (pseudo-)periodicity, the resultant patterns on the non-developable 3-D shape would be deformed with respect to the standard unit pattern, at the end of step 105, and would not deliver the desired electromagnetic properties.

The 2-D projection software predicts, depending on a desired distribution of the unit patterns over the surface S, the shape and arrangement that the patterns etched flat (the second patterns) must have for, after the initially planar surface having these patterns has been shaped in a mould, this desired distribution of the unit patterns (the first patterns) to be obtained on the surface S with the smallest possible lengthwise and anglewise distortion.

Figure 2:
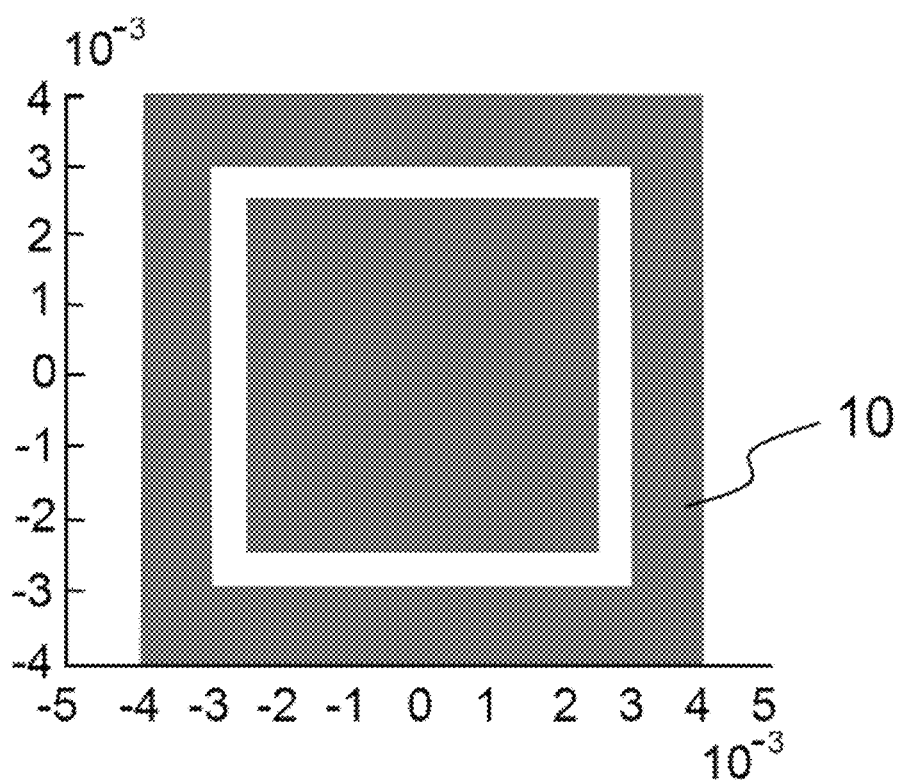
FIG. 2 shows a standard unit pattern in one embodiment of the invention.

In the considered example, in a sub-step 102_1, the 2-D projection software module is configured to receive as input:
  data defining the standard unit pattern (dimensions in x and y, geometry); for example, the standard pattern 10 is shown in FIG. 2 along orthogonal axes, x and y, that have been graduated in metres; it will be noted that in this particular embodiment, the shaded sections are intended to be made of metal, whereas the unshaded section corresponds to an absence of metal (the inverse is also possible in another embodiment);
  data defining the non-developable surface S, in the present case a parabolic surface; and
  data defining a mesh, by an orthogonal grid, of this surface S: the pitch of the mesh is defined depending on the surface and on the standard unit pattern: the finer the mesh, the more precise the map of the surface, but the longer the projection and computation time. Therefore, the smaller the size of the unit cell, the finer the mesh must be. For example, although it is not a strictly defined rule (it depends on the complexity of the pattern), the following is chosen:
    if d is the maximum dimension of the area of the surface, and m the mesh the ratio d/m must be lower than or equal to one quarter of the smallest dimension of the unit pattern.

Firstly, in a sub-step 102_2, the 2-D projection software module divides, where appropriate, the developable surface S into N segments, if the dimensions of S require it as a result of etching-related size limits and also of the approximation of the non-developable surface by a developable one by virtue of the ductility of the material. For each segment, a planar sub-set comprising an arrangement of second patterns to be etched will be obtained by implementing the following sub-steps.

Next, in each segment, in a sub-step 102_3, the projection software module performs a 3-D projection, onto the (segment of the) surface, of a planar distribution of first patterns that are each equal to the standard unit pattern and that are arranged periodically or pseudo-periodically (and for example organized into a matrix array). This projection is computed on the basis of the input data of the module.

For example, in the considered segment of the surface S, a 3-D mesh of S is produced using indices {i,j} representing a characteristic point of a first pattern, for example its centroid, then by projecting the first pattern (equal to the standard unit pattern) around each pair of indices {i,j} of this 3-D mesh using a LSCM algorithm (LSCM standing for least square conformal mapping).

In a sub-step 102_4, the projection software module further computes the deformations of the obtained projected patterns with respect to the standard unit pattern.

For example, the result of the deformation computation comprises a map that maps, as a function of the 2-D position of the pattern on the (segment of the) surface S, the lengthwise percentage deformation and another map that maps the anglewise percentage deformation (with respect to 90° between each side of the standard unit pattern, which here is square).

Figure 7:
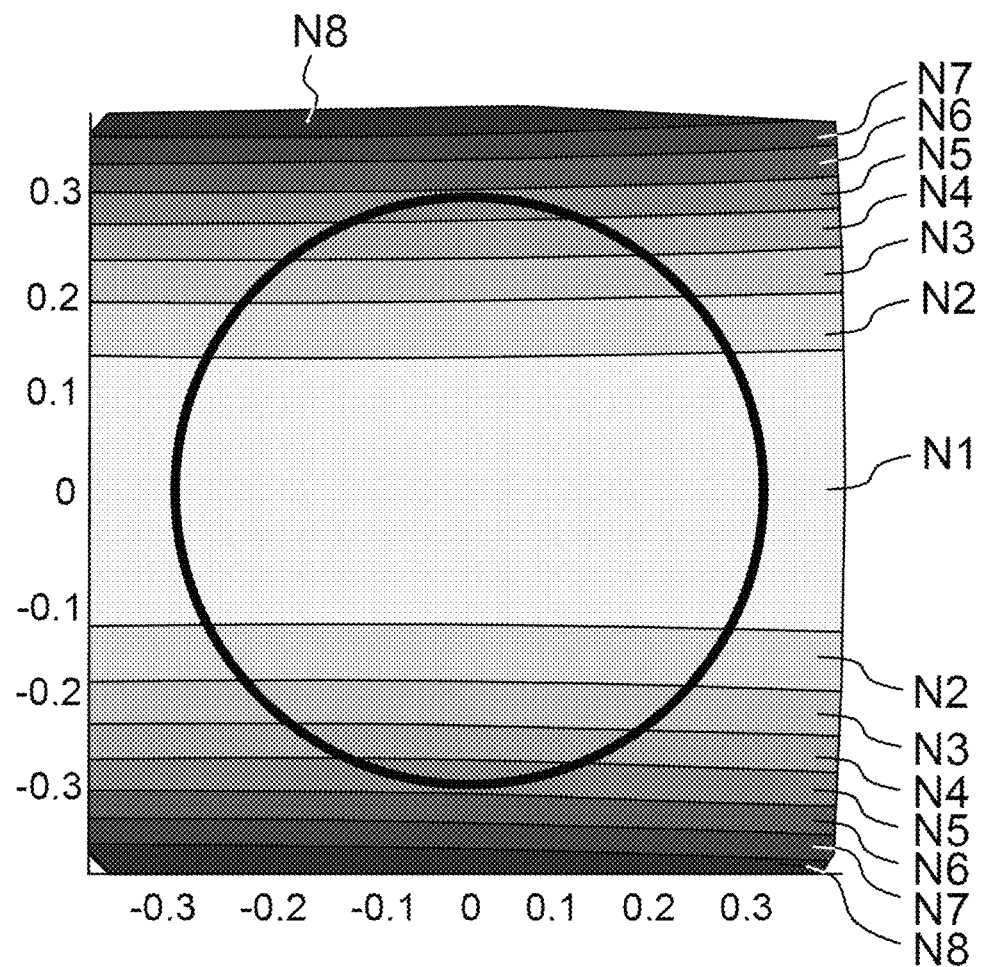
FIG. 7 shows a distortion map in one embodiment of the invention.

FIG. 7 shows, by way of example, a map of computed pattern length distortions along the y-axis of FIG. 2 (another map may be computed relative to the length of the pattern but this time in a dimension orthogonal to the preceding one, i.e. along the x-axis of FIG. 2, or indeed a map may be computed relative to the deformations of the angles made by the sides of the pattern). The %'s of error are separated into levels; one level is separated from the preceding one by 0.1% of error. The lowest error level, corresponding to the range [0%-0.1%], is located at the centre of the 3-D projection of the matrix array of patterns (at the ordinate 0 in FIG. 7) and the levels increase as the patterns get closer to the edges of the 3-D projection, which correspond to an error level of [0.7%-0.8%]. The circle represents a projection of the non-developable surface, here a parabola.

The projection software then indicates the percentages of lengthwise and anglewise deformation of each metal pattern on the non-developable surface. The designer judges whether these thresholds are lower than set limits, notably depending on the frequency response of the selected unit metal pattern and on its sensitivity to dimensional manufacturing tolerances. If these conditions are not met, then certain parameters are modified in order to anticipate the distortion of the patterns on the non-developable surface and the process described above is iterated from sub-steps 102_2 to 102_4. Parameter modification comprises at least one element among: modification of one or more first patterns, modification of the periodic distribution of the first patterns, and modification of the pitch of the mesh of the non-developable surface.

In other embodiments, only one of the thresholds is considered or indeed a single overall threshold encompassing both thresholds.

Next, in a sub-step 102_5, the software module projects all the metal patterns of the non-developable 3-D shape onto a 2-D surface. In one embodiment, this projection is carried out with the LSCM algorithm. In one embodiment, the two dimensions chosen are those corresponding to the two largest dimensions of the 3-D shape, this projection onto a plane from the surface S giving rise to an arrangement in this plane of second patterns and defining their respective shapes.

Figure 5:
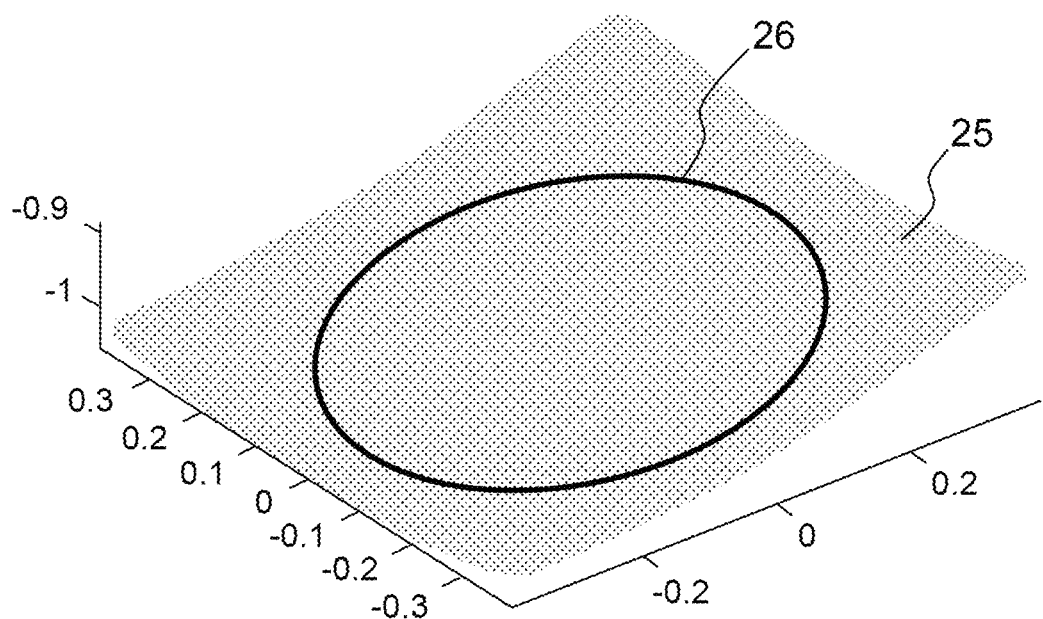
FIG. 5 shows a 3-D mesh of a parabolic surface in one embodiment of the invention.

FIG. 5 shows a 3-D mesh of a parabolic surface by indices {i,j}; if FIG. 5 were magnified, a plurality of points indexed by the pair {i,j} would be seen.

Figure 6:
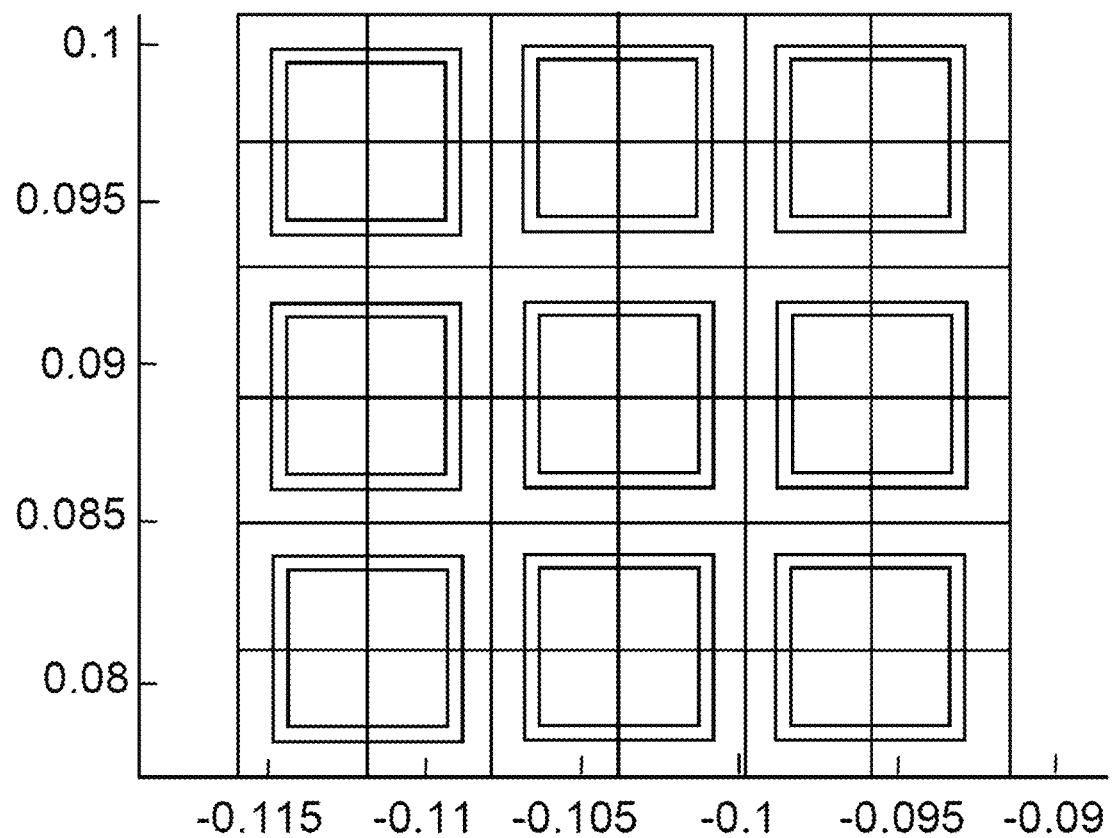
FIG. 6 shows the periodic organization, here taking the form of a 2-D matrix array, of standard unit patterns to be projected onto the 3-D mesh of the surface in one embodiment of the invention.

FIG. 6 shows a periodic repetition, here taking the form of a matrix array, of first patterns to be projected onto the 3-D mesh of the figure—the centre of each first pattern will be projected onto a point defined by a pair {i,j} of FIG. 5 (in other embodiments, it is not the centre of the patterns that is used, but another reference point defined beforehand with respect to the pattern).

Figure 4:
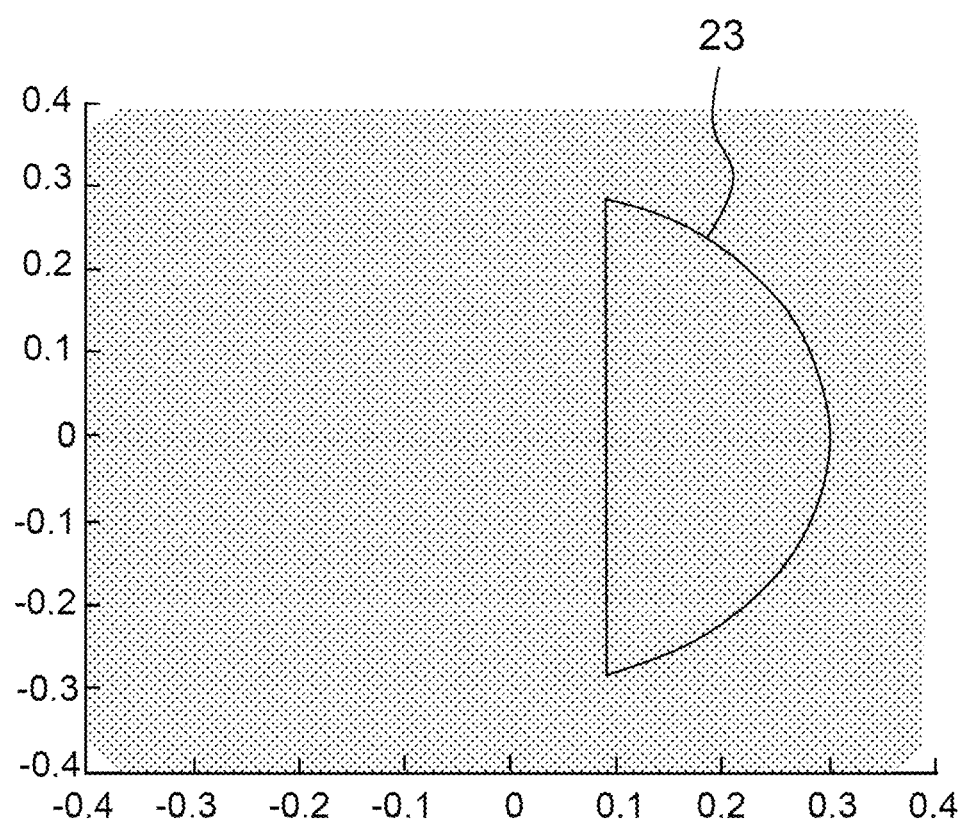
FIG. 4 shows the result of step 102 in one embodiment of the invention.

FIG. 4 is a representation of the projection result 23 obtained in step 102 for the segment 22 of non-developable surface and comprising an array of second patterns.

Figure 3:
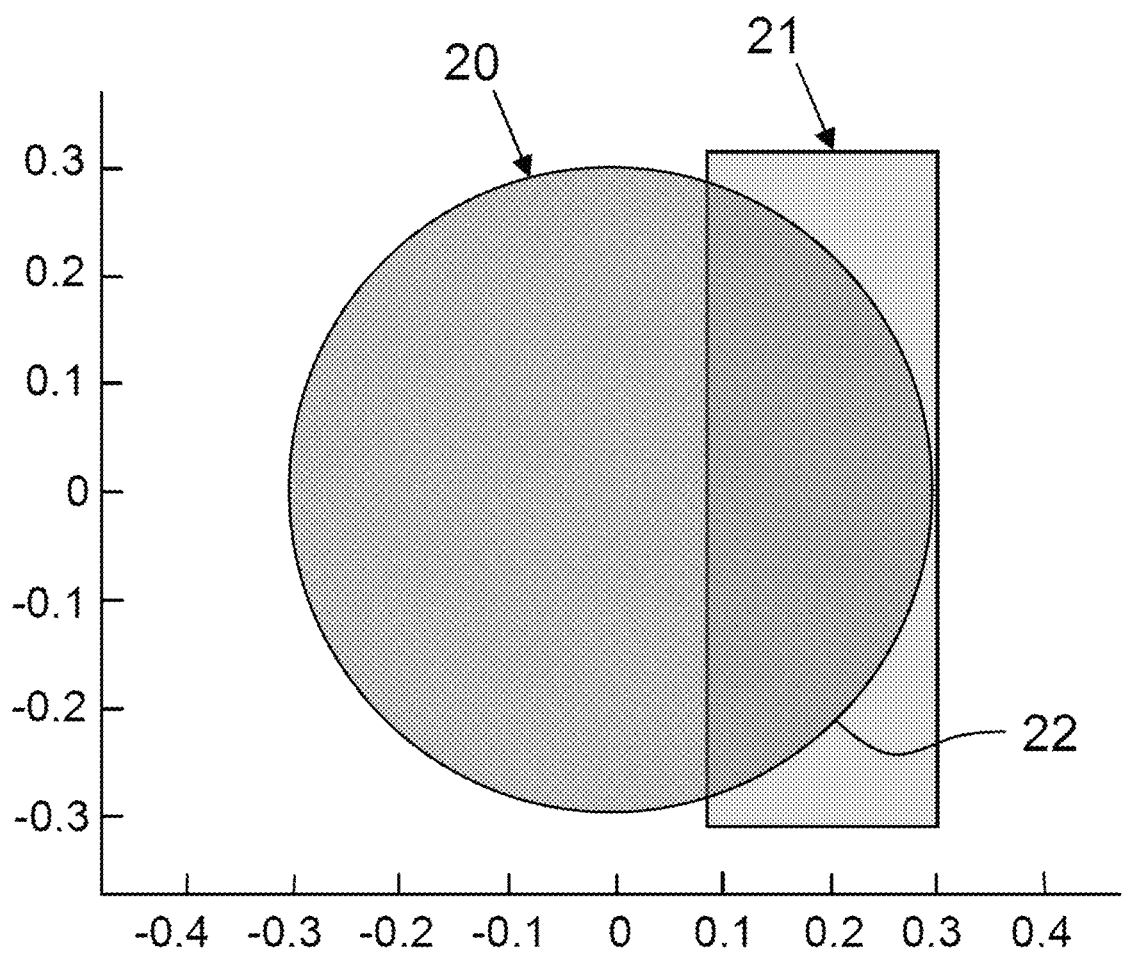
FIG. 3 shows a view from above of a parabolic non-developable surface and a divisional segment of said surface in one embodiment of the invention.

By way of illustration, FIG. 3 shows, seen from above, on the one hand the surface S (here a parabolic surface) and on the other hand one of the divisional segments 22 considered (produced notably from a planar copper sheet 21 that will be cut, then subjected to steps 103 to 105). FIG. 4 shows the arrangement 23 of second patterns resulting from the projection sub-step 102_5, obtained considering the segment 22.

The prior-art process for manufacturing a composite involves a single polymerization step. However, in the case in question, it is technically necessary to etch periodic or pseudo-periodic metal patterns into one or more thermosettable composite layers to be integrated into a non-developable 3-D final shape. However, this etching must be carried out on planar composite surfaces.

Therefore, and in accordance with the thicknesses of composite required to achieve electromagnetic functionalities, a new thermoforming process that is divided such as to contain two polymerizing steps is used:

In a step 103, a step of partial polymerization is carried out. Fabrics of fibres, which fabrics contain a resin in the dry state, are stacked on one another. A sheet of a metal, for example copper, a copper compound or nickel-chromium, is deposited on the thermosettable composite stack, which, at this stage, is not completely polymerized and therefore deformable. For example, two metal sheets (one on the front side and one on the back side of the stack) are used. Next, the resultant, planar assembly is placed in a vacuum oven, and temperature and pressure are increased, for a certain time. An incomplete first polymerization allows the thermosettable composite to be stiffened: it must, after this partial polymerization, be stiff enough to be etched and be strong enough for the one or more layers of metal patterns to be etched on the one or more partially polymerized plies, but will be able to be deformed subsequently (i.e. as explained below, it will be able when placed in a mould to conform to the 3-D shape of the mould). The pressure, temperature and time conditions prescribed by the manufacturer in respect of the polymerization are thus set experimentally depending on the materials used: heating to a lower temperature and/or for less time and/or at a lower pressure than is required to obtain complete polymerization.

In a step 104, a step of electrochemical etching is carried out. In one embodiment, the part in question corresponds to the part 21 of FIG. 3. A mask, defined depending on the second patterns and on their respective positions as defined in step 102, is placed in locations where it is desired to preserve the copper of the sheet, with a view to creating this arrangement of second metal patterns.

Thus, it is possible to etch, in this step, step 104, the metal patterns directly into one or more faces of the one or more composites (the unit pattern for the faces may be the same or not).

In one embodiment, chemical etching is preceded by an exposing phase in which a photosensitive film is applied to the metallized face, said metallized face being exposed by UV radiation through a mask the transparent portions of which correspond to said patterns, the exposed portions not being etched chemically.

Document U.S. Pat. No. 6,208,316 B1 discloses a process in which the metal patterns are manufactured by chemical etching on a carrier of the PTFE-based material called Duroid.

In a step 105, a second step of polymerization, complete polymerization this time, is carried out.

In this step the part is given its final shape with complete polymerization, thus creating the surface S of non-developable 3-D shape. It consists in shaping the plies resulting from the first polymerization step. To do this, in one embodiment, non-polymerized plies are placed under and on the etched plies in a dedicated mould. The shape of the surface of the mould is a mirror image of the desired non-developable surface, S. Next, a standard thermoforming process sets the structure in its targeted final non-developable 3-D shape, with all the plies perfectly polymerized and the patterns in the sought-after shape. Depending on the embodiment, to obtain complete polymerization, the prescribed polymerization pressure, temperature and bake conditions are met or they are modified.

It will be recalled that polymerization is a reaction in which monomer units bond to one another (via chemical bonds) to yield a molecule of high molecular weight that is referred to as a polymer.

In one embodiment, for a pair of layers of patterns, it is possible to encapsulate them pairwise. To assemble 2 pairs or an uneven number of layers of patterns, it is necessary to drill one or more holes, which will serve as one or more references (centring pins), allowing the filtering patterns to be aligned perfectly.

In the case where a plurality (n>1) of sub-sets of layers each comprising one layer of surface metal patterns (or one layer on each, bottom and top, face of the sub-assembly) must form part of the final composite material, the second patterns to be etched are defined for each metal layer of each sub-set, using steps 101 and 102, then the steps of partial polymerization and etching are iterated for each sub-set. Only when all the etched sub-sets of layers have been superposed (or apposed) and placed together in the mould, is complete polymerization (step 105) carried out.

To preserve an excellent alignment of the superposed patterns, at least one centring pin is used in the case of two superposed metal layers.

In some embodiments, the final stack further comprises one or more layers of possibly dense polymers.

In the embodiment described above, the division into N segments was carried out in step 102_2. In another embodiment, step 102_2 is not carried out and the steps up to 102_4 are applied to the entirety of the surface S, the division into N segments taking place between the end of step 102_4 and the start of step 102_5.

The present invention thus allows non-developable shapes with dedicated filtering patterns comprising one or more layers made of patterned filtering materials and one or more layers made of non-filtering materials to be manufactured by flattening out a 3-D design and carrying out thermoforming in a plurality of steps.

The present invention allows filtering patterns, for example for millimetre waves, of frequencies from 1 GHz to 300 GHz, or even lower than 1 GHz or indeed higher than 300 GHz, to be produced.

The present invention allows patterns of any size, including very small patterns, to be produced precisely. For example, with the chemical etching technology used to produce printed circuit boards, it is possible to achieve a pattern width of a small as 20 μm and a spacing of the same order of magnitude and a minimum thickness of the order of a few microns (typically 9 μm).

The present invention thus allows antennas or antenna arrays, dual-band parabolic antennas or antenna arrays for example, filtering radomes, polarization converters (conversion from linear to circular polarization), polarization collectors, and reflector arrays to be manufactured.

As known, the term thermosettable applies to a polymer material that becomes unmeltable and insoluble after polymerization. It is used to refer to a polymer the macromolecules of which unite, under the action of heat, via three-dimensional chemical bonding. Thermosettable plastics are plastics the plasticity of which begins to increase with temperature, then decreases and is practically zero after cooling. In other words, an object made of a thermosettable plastic keeps its shape (except at very high temperature and/or under extreme pressure). Unlike thermosettable plastics, thermoplastics are polymers that, under the action of temperature, melt or soften sufficiently to be shaped.

The invention claimed is:

1. A process for manufacturing a composite stack of 3-D shape, comprising a stack of layers of resin and fibre and at least one layer of metal patterns, said process comprising the following steps, a periodic or pseudo-periodic organization in 2-D of first patterns similar to a standard unit pattern having been determined for said layer of metal patterns depending on the electromagnetic function desired for the layer of metal patterns:
  i/ computing first patterns of said periodic organization once laid on the 3-D shape; then projecting, onto a plane, said patterns computed on the 3-D shape, thus defining a planar organization of second patterns;
  ii/ partially polymerizing, flat, by using a vacuum oven, at least one sub-set of first layers of said stack of layers, so as to make it electrochemically etchable, but to keep it deformable, said first layers being flat and comprising at least one metal layer on the surface of said sub-set to form a flat composite stack;
  iii/ electrochemically etching said organization of second patterns that was defined in step i into the metal layer of the flat composite stack resulting from step ii to form an etched composite stack:
  iv/ completely polymerizing the etched composite stack after said etched composite stack has been placed in a mould having the desired 3-D shape.

2. The process for manufacturing a composite stack of 3-D shape according to claim 1, wherein the shape is a non-developable shape.

3. The process for manufacturing a composite stack of 3-D shape according to claim 1, wherein, at the end of step i:
  the value of at least one parameter indicating deformations between the patterns projected onto said 3-D shape and a target unit pattern is computed; and
  said computed value is compared to a threshold; and
  if said value is higher than the threshold, a modification is made to said periodic or pseudo-periodic organization in 2-D of first patterns and/or to one or more first patterns; and before step ii is implemented, step i is iterated on the basis of said periodic or pseudo-periodic organization in 2-D of first patterns that was obtained after modification, steps ii to iv then being implemented on the basis of the planar organization of second patterns that was obtained after modification.

4. The process for manufacturing a composite stack of 3-D shape according to claim 3, wherein one or more parameters are computed among a parameter indicating a lengthwise deformation of the patterns and a parameter indicating an anglewise deformation of the patterns.

5. The process for manufacturing a composite stack of 3-D shape according to claim 3, wherein a deformation map is computed that represents, as a function of the position, on said 3-D shape, of the projected pattern, a deformation level.

6. The process for manufacturing a composite stack of 3-D shape according to claim 1, wherein the sub-set of first layers considered in step i comprises a metal layer on the bottom face of said sub-set and a metal layer on the top face of said sub-set and patterns are etched into each of the two metal layers in step iii.

7. The process for manufacturing a composite stack of 3-D shape according to claim 1, wherein the stack of layers comprises a plurality of sub-sets each comprising a stack of one or more layers of resin and fibre and of one or more periodic or pseudo-periodic metal layers:
  all of steps i, ii and iii are implemented on each sub-set, each sub-set being associated with its own organization of periodic or pseudo-periodic patterns; and
  step iv of complete polymerization in the mould is then implemented once the sub-sets each resulting from steps i, ii and iii have been stacked or laid together in the mould.

8. The process according to claim 1, wherein the function of said metal patterns is at least one function among that of filtering electromagnetic waves, of being an assembly or sub-assembly of the radiating element of an antenna and/or of modifying the EM-wave polarization.

9. The process according to claim 1, wherein the function of said metal patterns is to receive or transmit electromagnetic waves.

10. A process for manufacturing an element, comprising the process for manufacturing a composite stack according to claim 1, wherein the element is an element among an antenna, a radome and/or a polarizing surface.

* * * * *